US012103119B2

(12) United States Patent
Adcock et al.

(10) Patent No.: US 12,103,119 B2
(45) Date of Patent: Oct. 1, 2024

(54) ROBOTIC WELDING SYSTEM WITH ORBITAL WELDER POSITIONED ON ROBOTIC ARM

(71) Applicant: Caterpillar Inc., Peoria, IL (US)

(72) Inventors: Leon Adcock, Chillicothe, IL (US); Michael Alan Brewer, Metamora, IL (US); Michael H. Noble, Peoria, IL (US); Kevin Joustra, Juneau, WI (US)

(73) Assignee: Caterpillar Inc., Peoria, IL (US)

( * ) Notice: Subject to any disclaimer, the term of this patent is extended or adjusted under 35 U.S.C. 154(b) by 337 days.

(21) Appl. No.: 17/392,894

(22) Filed: Aug. 3, 2021

(65) Prior Publication Data

US 2023/0041636 A1  Feb. 9, 2023

(51) Int. Cl.
*B23K 9/095* (2006.01)
*B23K 9/028* (2006.01)

(52) U.S. Cl.
CPC .......... *B23K 9/0953* (2013.01); *B23K 9/0282* (2013.01)

(58) Field of Classification Search
CPC .... B23K 9/028; B23K 9/0282; B23K 9/0953; B23K 9/0956; E02F 3/8152; E02F 9/2891
USPC ..................................................... 219/137 R
See application file for complete search history.

(56) References Cited

U.S. PATENT DOCUMENTS

| | | |
|---|---|---|
| 3,514,830 A | 6/1970 | Shinjiro |
| 10,066,371 B2 | 9/2018 | Winter |
| 10,335,895 B2 | 7/2019 | Odakura et al. |
| 2005/0103766 A1 | 5/2005 | Iizuka et al. |
| 2010/0276406 A1* | 11/2010 | Silk .......... H02M 7/48 219/133 |
| 2017/0001268 A1* | 1/2017 | Jack ............... B23K 9/0282 |
| 2018/0221999 A1 | 8/2018 | Yuvaklioglu |
| 2020/0347569 A1 | 11/2020 | Cox |
| 2022/0040778 A1* | 2/2022 | Ruhstaller .......... B23K 9/046 |

FOREIGN PATENT DOCUMENTS

| | | |
|---|---|---|
| CN | 108453448 | 8/2018 |
| CN | 110919134 A | 3/2020 |
| DE | 202011000456 U1 | 5/2012 |

OTHER PUBLICATIONS

Written Opinion and International Search Report for Int'l. Patent Appln. No. PCT/US2022/038258, mailed Oct. 28, 2022 (12 pgs).

* cited by examiner

*Primary Examiner* — Dana Ross
*Assistant Examiner* — James F Sims, III (57) ABSTRACT

A robotic welder includes one or more motors, one or more articulating arms connected to the one or more motors, one or more sensors configured to image a wear plate for determining welding locations for welding the wear plate to a blade of a machine, and an orbital welder to rotate a torch head for welding the wear plate to the blade.

14 Claims, 5 Drawing Sheets

```
┌─────────────────────────────────────────────────────┐
│ CAUSE A TORCH HEAD OF AN ORBITAL WELDER TO POSITION AT │
│ A FIRST LOCATION PROXIMATE A FIRST WELD POINT BETWEEN A │
│          WEAR PLATE AND A BLADE 502                 │
└─────────────────────────────────────────────────────┘
                          │
                          ▼
┌─────────────────────────────────────────────────────┐
│  CAUSE, AT THE FIRST LOCATION, THE ORBITAL WELDER TO │
│      ROTATE TO WELD THE FIRST WELD POINT 504         │
└─────────────────────────────────────────────────────┘
                          │
                          ▼
┌─────────────────────────────────────────────────────┐
│   CAUSE THE TORCH HEAD OF THE ORBITAL WELDER TO BE   │
│   POSITIONED AT A SECOND LOCATION PROXIMATE A SECOND │
│   WELD POINT BETWEEN THE WEAR PLATE AND THE BLADE 506│
└─────────────────────────────────────────────────────┘
                          │
                          ▼
┌─────────────────────────────────────────────────────┐
│  CAUSE, AT THE SECOND LOCATION, THE ORBITAL WELDER TO│
│     ROTATE TO WELD THE SECOND WELD POINT 508         │
└─────────────────────────────────────────────────────┘
```

FIG. 5

ROBOTIC WELDING SYSTEM WITH ORBITAL WELDER POSITIONED ON ROBOTIC ARM

TECHNICAL DESCRIPTION

The present disclosure relates generally to a robotic welding system. More specifically, the present disclosure relates to a robotic welding system having an orbital welder for welding a wear plate to a blade of a machine, within accumulation members of the wear plate.

BACKGROUND

Earthmoving machines, such as graders, are used to perform displacement, distribution, and leveling of material, such as soil. A grader typically employs a blade assembly that includes a blade and a cutting edge that is attached to the blade. As the grader moves along a surface of material, the cutting edge penetrates the surface to permit the blade assembly to displace and level the material. During grading operations, the blade assembly scrapes the surface and is also impacted by debris, such as soil, gravel, rock, and organic material (e.g., plant material), resulting in wear to the cutting edge and/or the blade. Accordingly, frequent replacement of the cutting edge and/or the blade may be necessary. However, replacing the cutting edge and/or the blade is difficult and time consuming, thereby negatively impacting efficiency, a speed of grading operations, and/or usability of the grader.

Wear plates offer a solution to increase the lifespan of the cutting edge and/or the blade. For example, the wear plates couple to a working surface of the cutting edge and/or blade and endure much of the impact by the debris. Efficiently and effectively securing the wear plates to the blade remains a challenge. The wear plates, for example, may include complex geometries or features that provide difficulties when attempting to weld the wear plate to the blade. As an example, wear plates with a solid construction may be easy to weld, but wear plates with holes, depressions, or other features for reducing wear may be difficult to weld.

One attempt to weld two pieces of material is disclosed in, for example, U.S. Patent Application Publication No. 2005/0103766 (hereinafter, referred to as the "'766 reference"). The '766 reference describes an automatic groove-tracing welding system that is capable of carrying out a welding operation. The welding system of the '766 reference includes an image processor that receives an image signal representing an image of a weld zone, as obtained from a camera head, and processes the image to determine the position of a groove. The '766 reference then describes calculating a position between the groove and a welding torch and sending controlling a position of the welding torch to perform a welding operation. While the welding system of the '766 reference is aimed at welding grooves and positioning a welding torch, the welding system of the '766 reference does not describe an orbital welder attached to a robotic system for coupling a wear plate to a blade. The welding system of the '766 reference is therefore unable to account for complex geometries or features of the wear plate, thereby limiting a flexibility of the welding system. In doing so, the welding system of the '766 reference is not capable of securely coupling a wear plate to a blade, for example, in a circular fashion.

The present disclosure is directed to overcoming one or more of the deficiencies described above.

SUMMARY

In an aspect of the present disclosure, a system comprises a motor, an articulating arm coupled to the motor, an orbital welder coupled to the articulating arm, the orbital welder being configured to weld a wear plate to a blade of a machine, a sensor configured to capture sensor data, the sensor data being associated with a plurality of joint locations between the wear plate and the blade of the machine, and a controller configured to receive the sensor data from the sensor, and identify, using the sensor data, a joint location of the plurality of joint locations. Based at least in part on identification of the joint location by the controller the motor is configured to move the articulating arm relative to the wear plate such that a torch head of the orbital welder is positioned proximate the joint location, and the orbital welder is configured to weld the wear plate to the blade at the joint location.

In another aspect of the present disclosure, a robotic welder comprises one or more motors, one or more articulating arms connected to the one or more motors, one or more sensors configured to image a wear plate for determining welding locations for welding the wear plate to a blade of a machine, and an orbital welder configured to rotate a torch head for welding the wear plate to the blade.

In yet another aspect of the present disclosure, a method comprises receiving, from one or more sensors, sensor data corresponding to a welding location between a wear plate and a blade of a machine, the wear plate being disposed on a working surface of the blade, identifying, based on the sensor data, a location associated with a torch head of an orbital welder for welding the wear plate to the blade, causing one or more articulating arms to actuate, via one or more motors connected to the one or more articulating arm, to position the torch head at the location; and causing the orbital welder to weld at the welding location.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The devices and systems depicted in the accompanying figures are not to scale and components within the figures may be depicted not to scale with each other.

DETAILED DESCRIPTION

Figure 1:
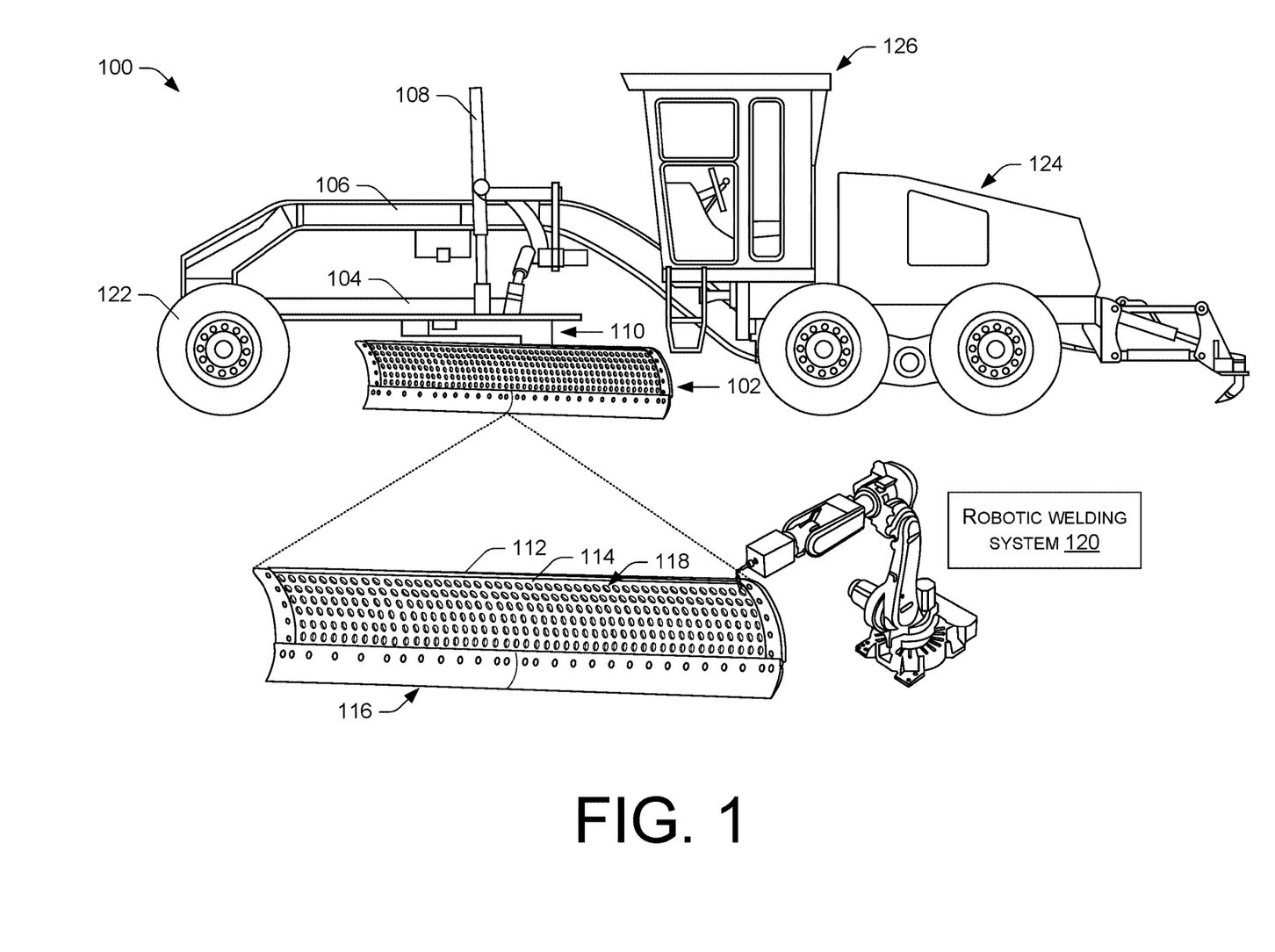
FIG. 1 illustrates an example machine including a wear plate welded to a blade of the machine, according to an example of the present disclosure. A robotic welding system having an orbital welder may be utilized to weld the wear plate and the blade together.

FIG. 1 is a diagram of an example machine 100 that includes a blade assembly 102. As shown in FIG. 1, the machine 100 may embody a motor grader. However, in other embodiments, the machine 100 may embody a loader, a plow, a dozer, an excavator, a skidsteer, and/or the like.

The machine 100 includes one or more frames, such as a first frame 104 and a second frame 106. In some instances, the first frame 104 and the second frame 106 are connected by an articulation joint (not shown) that permits the first frame 104 to articulate relative to the second frame 106. Additionally, one or more actuators 108 (e.g., hydraulic cylinders, pneumatic cylinders, etc.) may couple the first frame 104 and the second frame 106.

The blade assembly 102 may be attached to the first frame 104 by a mounting assembly 110, where the mounting assembly 110 is configured to support the blade assembly 102 above a surface. For example, the mounting assembly 110 may include a first attachment member associated with the blade assembly 102 that mates with, or otherwise attaches to, a second attachment member associated with the first frame 104.

The blade assembly 102, the actuators 108, and/or the mounting assembly 110 are configured to move the blade assembly 102 from an engaged position (e.g., a position in which blade assembly 102 is engaged with a surface being graded) to a disengaged position (e.g., a position in which the blade assembly 102 is disengaged from the surface). In addition, the blade assembly 102, the actuators 108, and/or the mounting assembly 110 are configured to move the blade assembly 102 in a plurality of positions suitable for grading a surface (e.g., a level position, a sloped position, an angled position, and/or the like).

The enlarged view of FIG. 1 illustrates that the blade assembly 102 includes a blade 112 and a wear plate 114 coupled (e.g., welded) to the blade 112. The blade 112 may be an elongated member having a width (e.g., a width parallel to a ground surface) greater than a height. Additionally, the blade 112 may be curved (e.g., having an arc-shaped profile) along the width of the blade 112, from an upper edge to a lower edge. The blade 112 has a working surface defined between the upper edge and the lower edge. The lower edge of the blade 112 defines a cutting edge 116 that is closer to the ground surface, and engages with the ground surface during a grading operation. During operation of the machine 100, and as material from the ground surface contacts the blade 112 (e.g., dirt, rock, etc.), the blade 112 is susceptible to damage, wear, and the like. Accordingly, the blade assembly 102 includes the wear plate 114 attached to the blade 112 (e.g., so as to cover a portion of a working surface). In some instances, the wear plate 114 represents a doubling plate that couples to the blade 112 for increasing a working life of the blade 112.

The wear plate 114 extends at least partially along the working surface of the blade 112. For example, the wear plate 114 may extend along the working surface of the blade 112 from the upper edge to the lower edge of the blade 112. In some instances, the wear plate 114 aligns with edges, sides, and/or a perimeter of the blade 112, or the wear plate 114 is offset (e.g., 0.5 inches, 1 inch, etc.) from the edges, sides, and/or a perimeter of the blade 112. For example, a width of the wear plate 114 may be less than the width of the blade 112 and/or the height of the wear plate 114 may be less than the height of the blade 112. The wear plate 114 may also be offset from the cutting edge 116, so as to not overlap or interfere with the cutting edge 116.

The wear plate 114 includes a plurality of accumulation members 118. In some instances, the accumulation members 118 extend through a thickness of the wear plate 114 and resemble channels, passages, and the like. In some instances, the accumulation members 118 are circular, ovular, hexagonal, square, rectangle, and/or any other shape. For example, although the accumulation members 118 are shown being circular, different cutout shapes and sizes may be used to optimize weight, cost, manufacturing, or performance of the wear plate 114.

In operation, the accumulation members 118 are configured to accumulate debris (e.g., soil, gravel, rock, and/or material that contacts the wear plate 114 during a grading operation). For example, the accumulation members 118 may accumulate the debris for providing dirt-on-dirt wear, as compared to the debris wearing the wear plate 114 and/or the blade 112.

As shown, the accumulation members 118 may be arranged in a grid of rows and columns, and may be randomly distributed across the wear plate 114, or may be distributed to areas of the wear plate 114 that correspond to areas of the blade 112 which experience wear during grading operations. Additionally, as shown in FIG. 1, the wear plate 114 embodies a continuous member (e.g., a single piece of material coupled to the blade 112). However, in some instances, the wear plate 114 represents multiple sections that couple to the blade 112 for forming the wear plate 114. Accordingly, the accumulation members 118 are distributed across a single piece of material coupled to the blade 112, or are distributed across a plurality of pieces of material coupled to the blade 112. In other words, rather than the accumulation members being disposed on a single wear plate, the accumulation members 118 may be disposed across a plurality of wear plates that individual weld to the blade 112.

The accumulation members 118 are associated with, or include, respective openings, that provide access for welding the wear plate 114 to the blade 112. For example, the accumulation members 118 may include an opening, such as a hole, extending from a first surface (e.g., front) to a second surface (e.g., back) of the wear plate 114. The second surface abuts or is in contact with the blade 112, whereas the first surface is be spaced apart from the blade 112. The wear plate 114 is attached to the blade 112 by welds (e.g., the wear plate 114 may be welded to the working surface of the blade 112). In some instances, a robotic welding system 120 is utilized for welding the wear plate 114 to the blade 112. As discussed in more detail in FIG. 2, the robotic welding system 120 includes articulating arm(s) (or other member(s)) that position a torch head of a welder (e.g., orbital welder or bore welder) of the robotic welding system 120. For example, the articulating arm(s) translate the torch head along, or about, one or more axes to position the torch head at welding locations.

In some instances, the articulating arm(s) position the torch head with respect to the accumulation members 118 for welding the wear plate 114 to the blade 112. The torch head may extend into the accumulation members 118 (e.g., via an opening) to weld the wear plate 114 to the blade 112.

For example, once within the accumulation member 118, the welder may cause the torch head to rotate, around an perimeter of the accumulation member 118, for welding the wear plate 114 to the blade 112. Rotation of the torch head may be provided by a motor of the welder. The motor allows the torch head to rotate at greater than speeds and precision permitted by the articulating arm(s) 200. In other words, the motor of the welder rapidly rotates the torch head to weld the wear plate 114 and the blade 112. During rotation, the welder 204 welds within the accumulation member 118 for joining the blade and the wear plate 114. In some instances, the robotic welding system 120 welds the wear plate 114 to the blade 112 at a plurality of locations, whether evenly spaced apart or randomly spaced apart. For example, the robotic welding system 120 may weld the wear plate 114 and the blade 112 at locations within a plurality of the accumulation members 118, respectively.

In some instances, the robotic welding system 120 includes sensor(s), such as camera(s), to locate the torch head of the robotic welding system 120 into place. For example, the camera(s) capture image data of the wear plate 114 and the robotic welding system 120 processes the image data to identify joints (e.g., seams, junctions, etc.) between the wear plate 114 and the blade 112. After locating the joints, the robotic welding system 120 positions the torch head into place, and the torch head is rotated in circular motion to complete the weld (in instances where the accumulation member 118 is circular). Such weld is performed using a quick and accurate single motion to deliver a quality weld. Moreover, after welding the wear plate 114 and the blade 112 within one accumulation member 118, the process repeats to weld the wear plate 114 and the blade 112 at locations within other accumulation members 118.

The robotic welding system 120 may be located within an environment in which the machine 100 is manufactured, or within an environment in which the blade assembly 102 is manufactured. In some instances, however, the robotic welding system 120 may be mobile and capable of being transported to work sites, construction sites, or other environments in which the machine 100 is used. For example, the robotic welding system 120 may be located at facilities for serving, repairing, etc. the machine 100 and/or the blade assembly 102.

In some instances, the wear plate 114 and/or the accumulation members 118 are formed by punching, drilling, laser cutting, water cutting, heat cutting, and/or the like. In some instances, the wear plate 114 is manufactured from materials composed of steel (e.g., mild steel, strengthened steel, high carbon steel, and/or the like). Although the application describes welding the wear plate 114 to the blade, the techniques discussed herein may be used to weld a wear plate to other implements, such as a bucket assembly that includes a bucket, a belly plate that includes a scrapper, or other ground-engaging tools. Such components may be parts of a excavators, backhoes, skid steers, or other earthymoving machines.

As further shown in FIG. 1, the first frame 104 and the second frame 106 are supported by wheels 122. However, in some instances, the first frame 104 and the second frame 106 may be supported by tracks, belts, and/or the like. Additionally, the machine 100 may include an engine 124, coupled to the first frame 104 and/or the second frame 106, or another power source, and an operator cab 126. An operator of the machine 100 may control steering of the machine 100 and/or a position of the blade assembly 102 (e.g., using interfaces, controls, and so forth located in operator cab 126).

The robotic welding system 120 permits the wear plate 114 to be securely welded to the blade 112, which reduces wear on the blade 112 caused by impacts of debris. The robotic welding system 120 includes a welder, such as an orbital welder that is able to rotate a torch head within small spaces for securing the wear plate 114 to the blade 112. Using the orbital welder coupled to articulating arm(s) of the robotic welding system 120 permits increased flexibility when welding, and allows for the accurate placement of the torch head within the accumulation members 118 for welding the wear plate 114 and the blade 112. As such, the robotic welding system 120 described herein allows for efficient and high velocity welds of the wear plates 114 to the blade 112.

Figure 2:
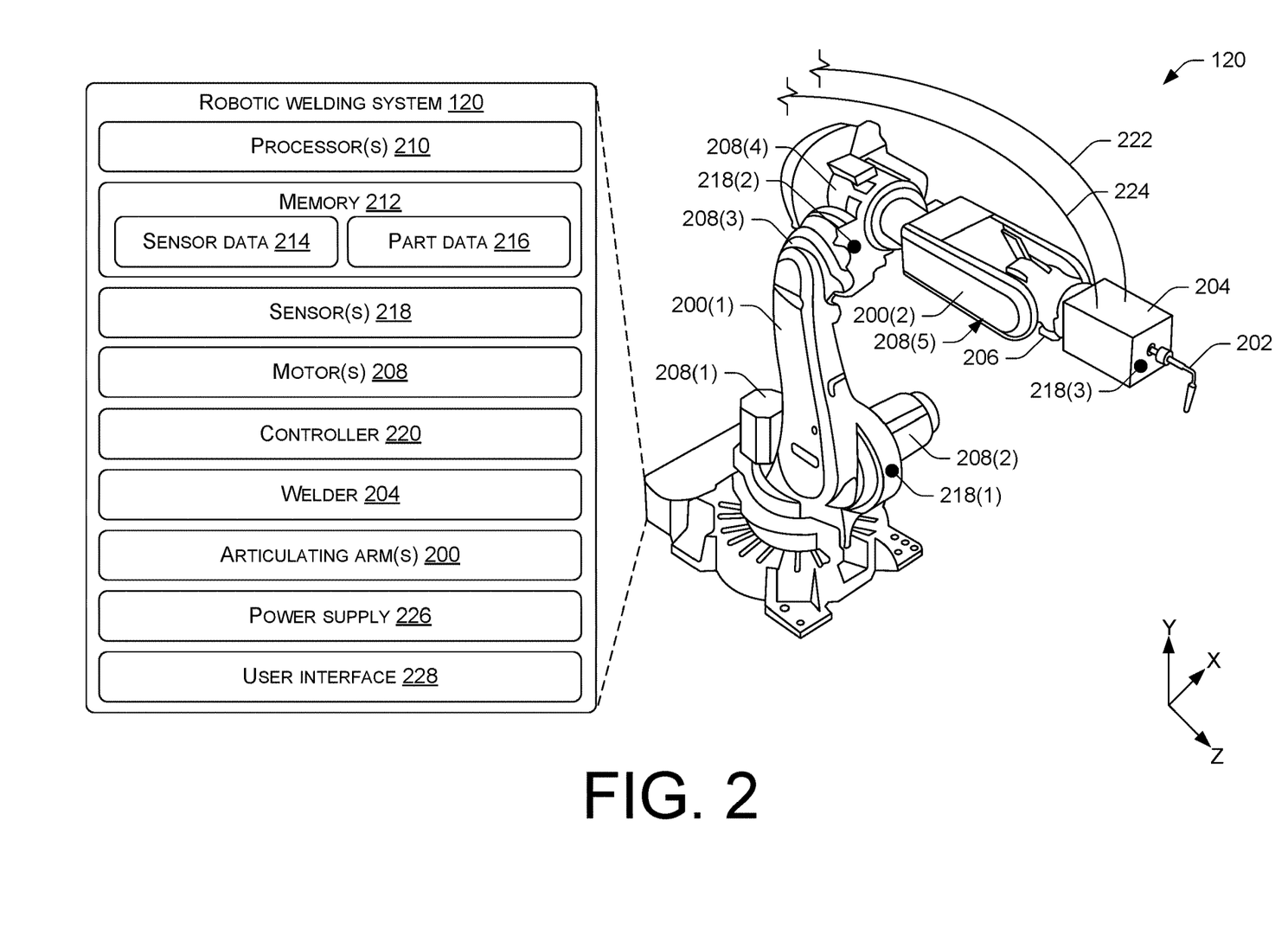
FIG. 2 illustrates example components of the robotic welding system, according to an example of the present disclosure.

FIG. 2 illustrates example components of the robotic welding system 120 used to couple (e.g., weld) the wear plate 114 to the blade 112. The robotic welding system 120 is shown including one or more articulating arm(s) 200, such as a first articulating arm 200(1) and a second articulating arm 200(2), that effectuate to move a torch head 202 of a welder 204. The first articulating arm 200(1) and the second articulating arm 200(2) couple together to pivot, rotate, translate, and/or otherwise move the torch head 202. As shown, the welder 204 couples to, or is disposed at an end of, the second articulating arm 200(2). A link 206 couples the welder 204 to the second articulating arm 200(2) such that the articulating arm(s) 200 positions the torch head 202. For example, the link 206 may pivot within the second articulating arm 200(2) to position the torch head 202.

Motor(s) 208 operably couple to the articulating arm(s) 200 such that the articulating arm(s) 200 are able to pivot, rotate, translate, and/or otherwise move the torch head 202. For example, with reference to the Cartesian Coordinate System, a first motor 208(1) may provide rotational movement about the Y-axis, a second motor 208(2) may provide rotational movement about the X-axis, a third motor 208(3) may provide rotational movement about the X-axis, a fourth motor 208(4) may provide rotational movement about the Z-axis, and a fifth motor 208(5) may provide rotational movement about the X-axis. The motor(s) 208 may couple to the first articulating arm 200(1), the second articulating arm 200(2), and/or the link 206 for providing movement to the robotic welding system 120. However, more than or less than five motor(s) may be used to provide movement to the robotic welding system 120. Additionally, more than or less than two articulating arms 200 (or other members) may be used for articulating the torch head 202 (or more generally, the welder 204). In some instances, the motor(s) 208 may include alternative current (AC) motors, direct current (DC) motors, servo motors, stepper motors, and the like. However, pneumatic actuators, hydraulic cylinders, or other actuators mounted to and/or otherwise coupled to the articulating arm(s) 200 may be configured to move the torch head 202.

In some instances, the welder 204 represents an orbital welder that rotates the torch head 202. Additionally, the welder 204 may represent a bore welder. An example welder may include a Bore Welder manufactured by Climax of Newberg, Oregon. The welder 204 may include an internal motor that rotates the torch head 202 about the Z-axis. The motor of the welder 204 rotates the torch head 202 at speeds greater than those permitted by speeds of the motor(s) 208 and/or those possible by the articulating arm(s) 200. For example, the torch head 202 may include a small form factor so as to be insertable within the accumulation members 118, and the motor of the welder 204 rotates rapidly to rotate the torch head 202 to effectuate the weld within the accumulation members 118. Moreover, by limiting movement to the torch head 202, as compared to the articulating arm(s) 200, the robotic welding system 120 welds with increased accuracy and precision compared to conventional techniques. As shown, the torch head 202 includes an angled torch head for permitting the torch head 202 to be disposed within the accumulation members 118. Different torch heads (e.g., shape, size, angle, etc.) may be utilized depending on a configuration of the accumulation members 118.

To further illustrate, once the torch head 202 is positioned in place, for example, via the articulating arm(s) 200, the motor of the welder 204 actuates to rotate the torch head 202. During this instance, the articulating arm(s) 200 may remain stationary. As such, the motor(s) 208 rotate, translate, and/or otherwise move the articulating arm(s) 200, and once in position, the welder 204 actuates to cause the welder 204 to weld. However, in some instances, the articulating arm(s) 200 may actuate (e.g., rotate) during welding. The coordinated movement between the articulating arm(s) 200 and the welder 204 may permit the robotic welding system 120 to weld non-circulator joints.

Figure 3:
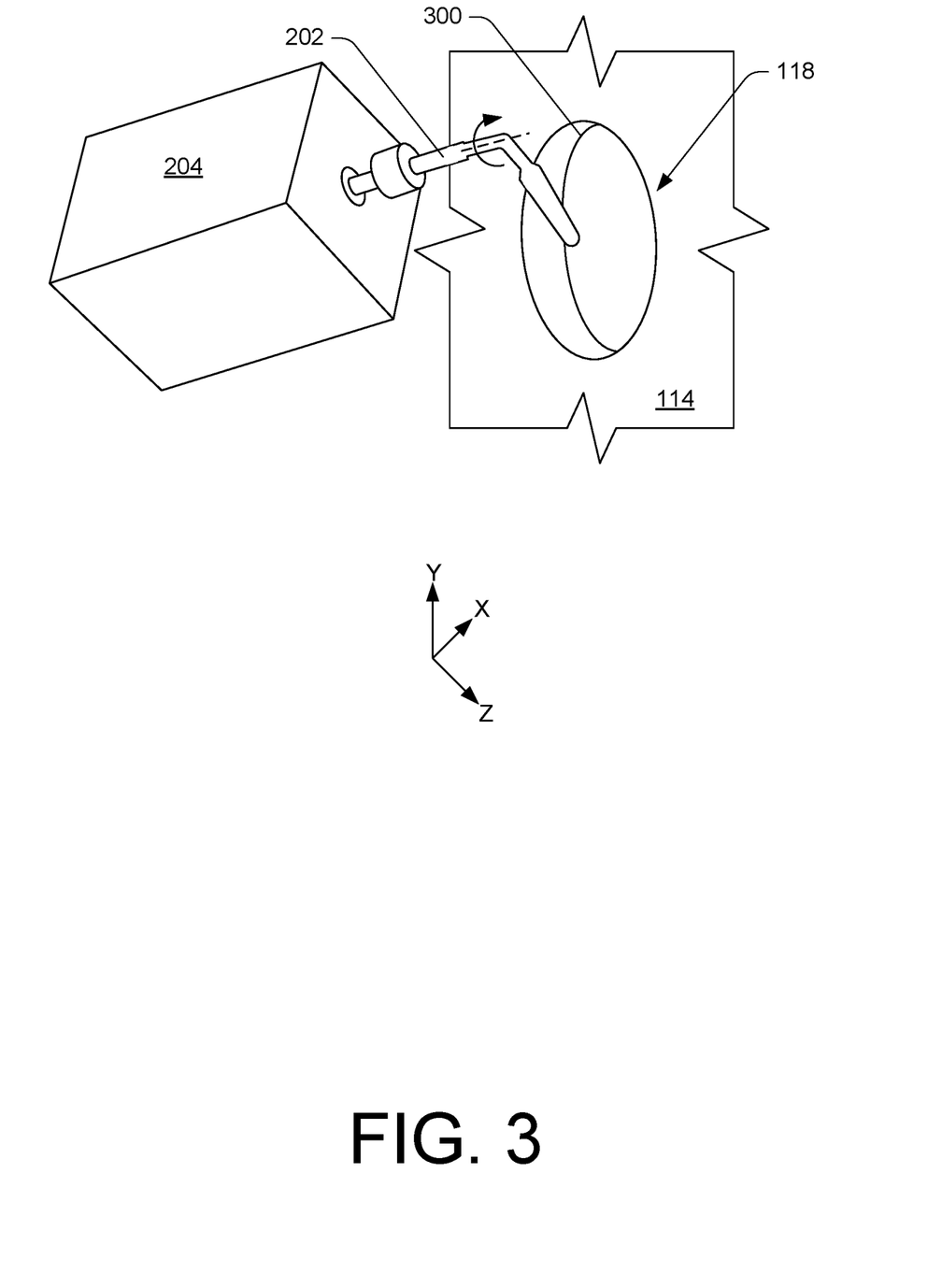
FIG. 3 illustrates an example torch head of the robotic welding system positioned proximate to an accumulation member of the wear plate, according to an example of the present disclosure. The torch head welds a seam between the wear plate and the blade, within the accumulation member, for coupling the wear plate and the blade.

As explained in more detail herein with reference to FIG. 3, the torch head 202 may be positioned at least partially within the accumulation member 118 (e.g., via the motor(s) 208 actuating the articulating arm(s) 200), and once within the accumulation member 118, the welder 204 may actuate (e.g., weld) while rotating the torch head 202. Such process welds an interior of the accumulation member 118 (or more generally, the wear plate 114) to the blade 112. This may repeat for welding the wear plate 114 to the blade 112 at other locations.

The robotic welding system 120 is shown including processor(s) 210 and memory 212, where the processor(s) 210 may perform various functions and operations associated with controlling the robotic welding system 120 and the memory 212 may store instructions executable by the processor(s) 210 to perform the operations described herein. For example, the memory 212 is shown storing or having access to sensor data 214 and part data 216. The sensor data 214 may be generated by various sensor(s) 218 of the robotic welding system 120. Examples of the sensor(s) 218, include but are not limited to, proximity sensor(s), temperature sensor(s), acceleration sensor(s), positioning sensor(s), optical sensor(s), a two-dimensional digital camera, a three-dimensional digital camera, or a range finding sensor, including but not limited to a radar sensor, a light detection and ranging (LIDAR) sensor, a proximity sensor, or the like. The sensor data 214 generated by the sensor(s) 218 may be used for at least partially controlling an operation of the robotic welding system 120. For example, the sensor(s) 218 may generate data indicating a position of the articulating arm(s) 200 and/or the torch head 202. Such sensor data 214 is used for causing actuation of the motor(s) 208 to particular locations and/or causing the welder 204 to weld the wear plate 114 to the blade 112. The sensor(s) 218 may be disposed about, on, and/or within the articulating arm(s) 200, the welder 204 and/or the torch head 202.

In FIG. 1, example sensor(s) 218(1)-(3) are shown disposed about the robotic welding system 120. For example, the first sensor 218(1) may represent a positional sensor disposed on the first articulating arm 200(1). The second sensor 218(2) may represent a positional sensor disposed on the second articulating arm 200(2). The third sensor 218(3) may represent a camera disposed on the welder 204. Image data captured by the third sensor 218(3) may be processed for use in identifying locations of the accumulation members 118, as well as a welding location associated with the accumulation members 118.

To this point, in some instances, the sensor data 214 may include image data generated by camera(s). The sensor data 214 may be analyzed to identify joint, or seams, between the wear plate 114 and the blade 112. For example, the camera may be disposed at an end of the second articulating arm 200(2), on the link 206, and/or the welder 204, proximate to the torch head 202. The camera generates image data depicting the accumulation member 118. The image data is analyzed, using image processing techniques, to identify a seam between the wear plate 114 and the blade 112. Once identified, this information may be utilized to control a position of the torch head 202. For example, the motor(s) 208 may actuate to pivot, translate, or move the articulating arm(s). Such movement position(s) the torch head 202 adjacent to, or at least partially within, the accumulation member 118. For example, a rotational axis of the torch head 202 may be aligned with a center of the accumulation member 118. The articulating arm(s) 200 positions the torch head 202 such that the rotational axis of the torch head 202 is substantially collinear with an axis of the accumulation member 118 to be welded. After the torch head 202 is in position, and knowing the seam between the wear plate 114 and the blade 112, the welder 204 welds the wear plate 114 and the blade 112 together. The welding is done in a quick accurate single motion to deliver quality weld.

Although FIG. 2 illustrates a particular number of sensor (s), the robotic welding system 120 may include more than or less than three sensor(s). Additionally, the sensor(s) 218(1)-(3) are merely illustrative and may be disposed or coupled to other components of the robotic welding system 120 than shown.

The part data 216 corresponds to characteristic(s) of the wear plate 114. For example, the part data 216 may include a location of the accumulation members 118 on the wear plate 114, a number of the accumulation members 118 on the wear plate 114, a shape and/or size of the accumulation members 118, a shape and/or size of the wear plate 114, and so forth. The part data 216 may be used for knowing the locations of the accumulation members 118 such that the wear plate 114 may be welded to the blade 112. That is, knowing the locations and the characteristic(s) of the accumulation members 118 permits the torch head 202 to be positioned at respective locations for welding the wear plate 114 to the blade 112. Introduced above, the sensor data 214 may be used in conjunction with the part data 216 for positioning the torch head 202 at locations for welding the wear plate 114 and the blade 112.

The robotic welding system 120 is further shown including a controller 220. In some instances, the controller 220 may control an operation of the robotic welding system 120, such as where and when the articulating arm(s) 200 actuate, when the welder 204 welds, and so forth. The controller 220 communicatively couples (e.g., via wired or wireless technologies) to the motor(s) 208, the welder 204, and other components for controlling an operation thereof. For example, the controller 220 may transmit instruction(s) to the motor(s) 208, respectively, that cause the motor(s) 208 to actuate for controlling a position of the torch head 202 relative to the wear plate 114. Moreover, the controller 220 may transmit instruction(s) to the welder 204 for causing the welder 204 to rotate the torch head 202 and/or causing the welder 204 to weld.

The controller 220, in some instances, utilizes the sensor data 214 and the part data 216 for controlling operation(s) of the robotic welding system 120. In other words, the video, images, location information, orientation information, and/ or other sensor data captured by the sensor(s) 218 is used to assist in welding the wear plate 114 to the blade 112. For instance, the controller 220 may receive the video, images, location information, orientation information, and/or other sensor data captured by the sensor(s) 218. The controller 220 is also configured to identify, using such sensor data 214, locations of weld spots, such as seams, between the wear plate 114 and the blade 112. As noted above, the motor(s) 208, welder 204, articulating arm(s) 200 and/or other components of the robotic welding system 120 are operably connected to the controller 220 such that the controller 220 control one or more functions thereof. For example, the controller 220 receives the sensor data 214 captured by the sensor(s) 218 and enters such sensor data 214 (e.g., video, one or more images, etc.) into an image recognition engine, algorithm, model, or other component. Such components may identify the welding locations. The controller 220 then uses the output from such components to control movement of the articulating arm(s) 200. In particular, the controller 220 uses the sensor data 214 received from the sensor(s) 218 and/or output received from the image recognition engine or other components noted above to control operation of the welder 204. Such operation includes moving the torch head 202 to a welding location and causing the welder 204 to actuate to weld the wear plate 114 and the blade 112.

Moreover, it is to be understood that the controller 220 may continuously receive the sensor data 214 (as well as other data) for knowing a state of the robotic welding system 120 and controlling operations undertaken by the robotic welding system 120. Such data, for example, indicates when the welder 204 is done welding for causing the torch head 202 to move to other accumulation members 118 for further welding the wear plate 114 and the blade 112.

Wires, cables, conduits, and other ductwork route to the welder 204 (and/or proximate the welder 204). For example, a wire 222 may extend into the welder 204 for serving as a wire feed to be welded. A motor of the welder 204 may draw the wire 222 into the welder 204 and feed the wire out the torch head 202 for welding. A cable 224 may supply power to the welder 204. Additional wires, cables, and so forth may be coupled, or received by, the welder 204. For example, lines may supply shielding gas to an area proximate the torch head 202. Exhaust lines may further exhaust air (e.g., fumes) proximate the torch head 202. Although shown at a particular location, the wire 222 and cable 224 may attach to the welder 204, or be fed into the welder 204, at different locations than shown in FIG. 2.

A power supply 226 is shown for providing power to the robotic welding system 120. The power supply 226 is capable of providing a sufficient amount of voltage and amperes to the welder 204 (e.g., 120V). The power supply 226 provides power to the sensor(s) 218, the motor(s) 208, and other electric components of the robotic welding system 120.

In some instances, the robotic welding system 120 may include a user interface 228, that receives input from an operator of the robotic welding system 120. The operator, for example, provides touch input to the user interface 228 for controlling movement, welding, and so forth of the robotic welding system 120. As an example, the operator provides touch input to control an actuation of the motor(s) 208 to pivot, rotate, translate, or otherwise move the articulating arm(s) 200. The operator may control the robotic welding system 120 for positioning the torch head 202 proximate to the accumulation members 118. Once in position, the operator provides an indication for the welder 204 to begin welding. Although discussed as a touch-sensitive user interface, the robotic welding system 120 may include other input devices (e.g., joystick, mouse, keyboard, microphone(s), etc.) for at least partially controlling an operation of the robotic welding system 120.

In some instances, the robotic welding system 120 may be configured to perform tasks autonomously (e.g., without receiving input from an operator). For example, noted above, the robotic welding system 120 may capture the sensor data 214, process the sensor data 214 to determine locations of the accumulation members 118, determine a path or sequence by which to weld the wear plate 114 to the blade 112, and cause the articulating arm(s) to position the torch head 202 along the path for welding the wear plate 114. However, in some instances, the robotic welding system 120 is configured to perform one or more such tasks semi-autonomously (e.g., based at least in part on input received from the operator).

Although not shown, the controller 220 (or more generally, the robotic welding system 120) may be in communication with one or more electronic devices. Such electronic devices comprise, for example, mobile phones, laptop computers, desktop computers, tablets, and/or wearable devices (e.g., smart glasses, smart watches, etc.) of project managers (e.g., foremen) overseeing operations within a facility in which the machine 100 is manufactured. In some instances, one or more such electronic devices includes functionality to determine welding locations for coupling the wear plate 114 and the blade 112. By way of a nonlimiting example, such electronic devices may receive sensor data and/or other information (e.g., point cloud data, an image, a set of images, or combinations thereof) generated by the sensor(s) 218. In turn, the electronic devices may determine welding locations and transmit instructions back to the controller 220 for effectuating the welds.

As used herein, a processor, such as the processor(s) 210 may include multiple processors and/or a processor having multiple cores. Further, the processor(s) 210 may comprise one or more cores of different types. For example, the processor(s) 210 may include application processor units, graphic processing units, and so forth. In one implementation, the processor(s) 210 may comprise a microcontroller and/or a microprocessor. The processor(s) 210 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 210 may possess its own local memory, which also may store program components, program data, and/or one or more operating systems.

Memory, such as the memory 212 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 212 may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 210.

FIG. 2 therefore illustrates that the robotic welding system 120 includes components for welding the wear plate 114 to the blade 112. The robotic welding system 120 includes an orbital welder coupled to the articulating arm(s) 200, which are configured to locate, position, orient, or otherwise move the torch head 202 proximate the accumulation members 118. In some instances, the controller 220 controls an operation of the robotic welding system 120, such as moving the articulating arm(s) 200 or causing the welder 204 to weld. Additionally, or alternatively, an operator may interact with the user interface 228 for at least partially controlling an operation of the robotic welding system 120.

FIG. 3 illustrates an example of welding the wear plate 114 and the blade 112. As discussed above, the wear plate 114 includes a plurality of accumulation members 118. A single accumulation member 118 is shown in FIG. 3. The motor(s) 208 and the articulating arm(s) 200 are used to position the torch head 202 of the welder 204 proximate the accumulation member 118. In some instances, a rotational axis of the torch head 202 may be concentrically aligned with a central axis of the accumulation member 118. For example, in instances where the accumulation member 118 includes a circular shape, the rotational axis of the torch head 202 aligns with the center of the accumulation member 118. In this position, the welder 204 actuates a motor to rotate the torch head 202 about the rotational axis. This rotation (as well as the actuation of the welder 204) permits the wear plate to be welded to the blade 112. Rotation of the torch head 202 is illustrated with an arrow, about a rotational axis of the torch head 202.

The accumulation members 118 may each include a perimeter 300 that is disposed adjacent to the wear plate 114. The perimeter 300 is disposed at opening of the accumulation member 118, on a rear surface that abuts the blade 112. The perimeter 300 is representative of a joint location between the wear plate 114 and the blade 112, whereby the welder 204 is instructed to weld for coupling the wear plate 114 and the blade 112. The torch head 202 rotates to weld the perimeter of the accumulation member 118 (and therefore the wear plate 114) to the blade 112. A weld created may extend at least partially into the accumulation members 118, as well as towards a front surface of the wear plate 114.

FIG. 3 therefore illustrates an example scenario in which the torch head 202, or more generally, the welder 204 is positioned proximate the accumulation member 118. Once positioned, a motor of the welder 204 causes the torch head 202 to rotate, to weld the perimeter 300 of the accumulation member 118, at an intersection between the wear plate 114 and the blade 112. This process repeats for welding the wear plate 114 and the blade 112 at locations associated with other accumulation members 118.

Figure 4:
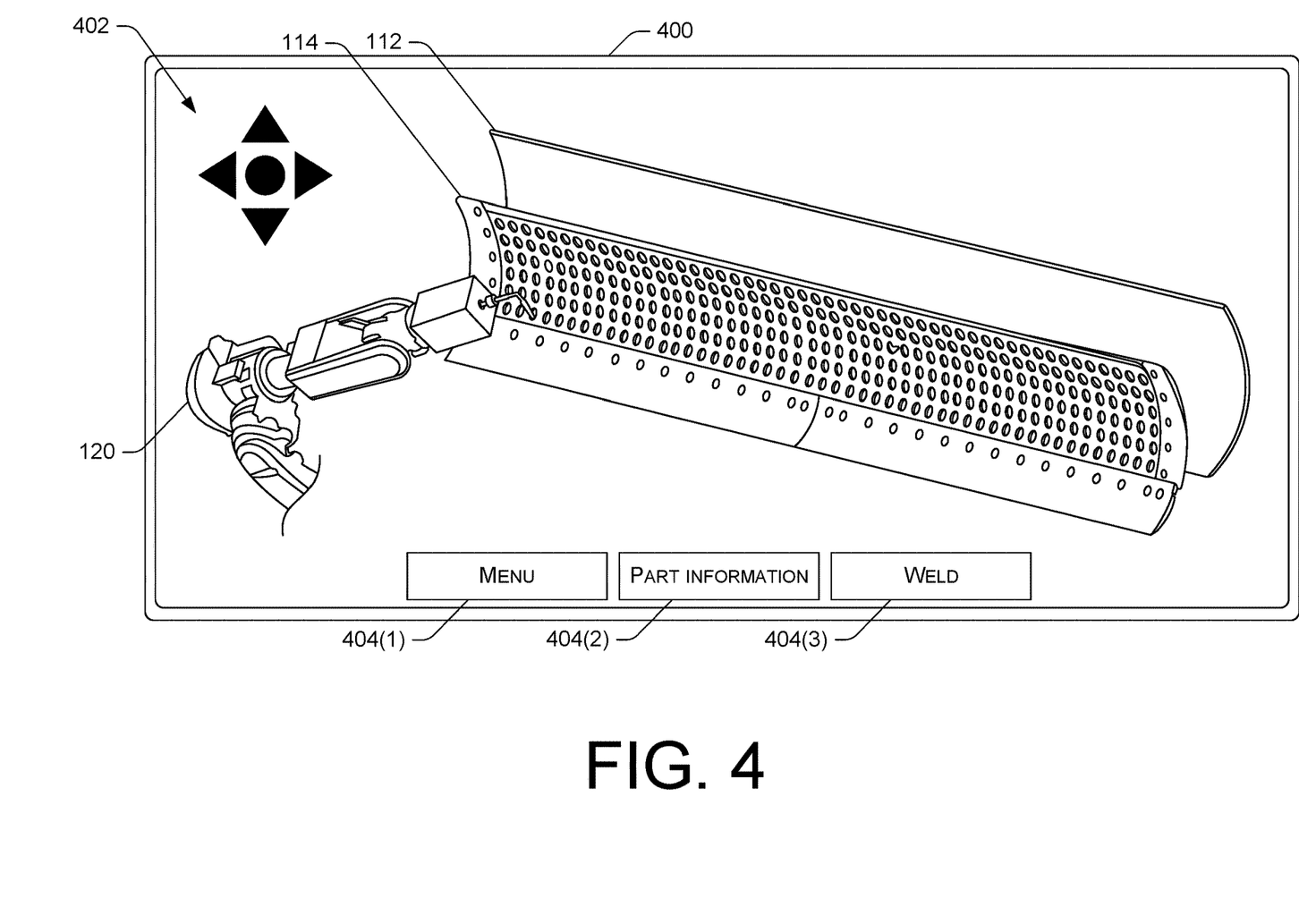
FIG. 4 illustrates an example user interface in which an operator interacts for at least partially controlling an operation of the robotic welding system, according to an example of the present disclosure.

FIG. 4 illustrates an example user interface 400, such as the user interface 228, for controlling an operation of the robotic welding system 120. In some instances, the user interface 400 shown in FIG. 4 is representative of an interface in which an operator of the robotic welding system 120 interacts for welding the wear plate 114 to the blade 112. As shown in FIG. 4, the user interface 400 may present a depiction of the robotic welding system 120, the blade 112, and the wear plate 114. In some instances, the sensor(s) 218, such as camera(s), capture image data depicting the robotic welding system 120, the blade 112, and the wear plate 114 for display on the user interface 400.

The operator of the robotic welding system 120 may interface with a navigator 402 for controlling a movement of the robotic welding system 120. For example, the operator may utilize arrows, switches, or toggles presented on the user interface 400. Upon receiving input, the controller 220 processes the inputs for causing movement of the robotic welding system 120. Such movement may come by way of the articulating arm(s) 200. For example, from the depiction of the robotic welding system 120 shown on the user interface 400, the operator may press the "up" arrow of the navigator 402. In response, the controller 220 instructs the motor(s) 208 to actuate one or more of the articulating arm(s) 200 to move the robotic welding system 120 upward (as shown on the user interface 400). More particularly, the operator interacts with the navigator 402 for moving a location of the torch head 202. Movement of the torch head 202 comes by way of movement of the articulating arm(s) 200. Other movements, such as rotational, are also envisioned.

The user interface 400 is further shown including various icons, such as icon(s) 404(1)-(3). The first icon 404(1) may represent a "menu" icon whereby the operator adjusts setting(s), control(s), display(s), and so forth associated with the user interface 400. The second icon 404(2) may include part information, whereby the operator identifies characteristics of the wear plate 114, for example. Such characteristic(s) include, for example, a size of the wear plate 114, a pattern of the accumulation members 118 on the wear plate 114, a size of the accumulation members 118, a computer-aided design (CAD) of the wear plate 114, and so forth. Utilizing the part information, the operator may determine welding locations, or a welding path, for the welder 204 to couple the wear plate 114 and the blade 112.

The third icon 404(3) may be associated with welding the wear plate 114 to the blade 112. For example, after the operator has positioned the torch head 202 at a location for welding the wear plate 114 to the blade 112, the operator provides touch input to the third icon 404(3). In response, the welder 204 may begin welding, whether at a specific accumulation member 118 or along a path for welding multiple accumulation members 118.

Although FIG. 4 illustrates particular icons presented on the user interface 400, it is to be understood that the user interface 400 may include more than or less than the number of icons presented. Additionally, the icon(s) 404 may be located differently than shown, and/or the icon(s) may be associated with other functionalities (e.g., pause, power down, power up, etc.). Still, the user interface 400 may update to display a progress of the robotic welding system 120 welding the wear plate 114 and the blade 112 together. From this, the operator may observes a progress of the wear plate 114 being welded to the blade 112.

As such, FIG. 4 illustrates an example user interface 400 in which an operator controls function(s) of the robotic welding system 120. Controlling the robotic welding system 120 in this manner allows an operator to select positions at which the wear plate 114 and the blade 112 are welded together. For example, the operator may move the torch head 202 (via the navigator 402), for positioning the torch head 202 proximate to the accumulation members 118. Therein, the operator may utilize the user interface 400 to weld the wear plate 114 and the blade 112.

Figure 5:
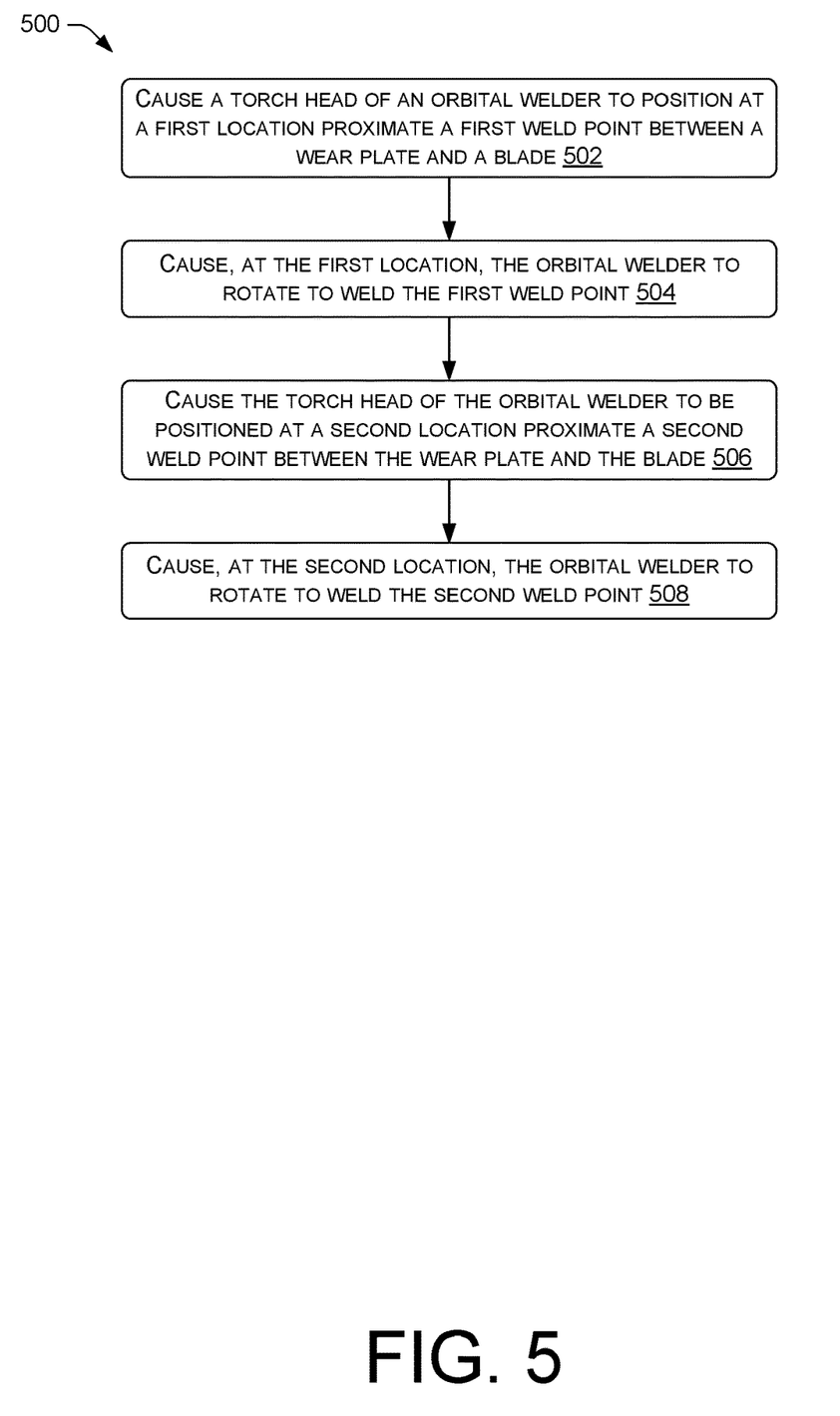
FIG. 5 illustrates an example process for welding a wear plate and a blade, according to an example of the present disclosure.

FIG. 5 illustrates an example process 500 for welding the wear plate 114 and the blade 112 at a plurality of locations, such as at the accumulation members 118, or a seam between the accumulation members 118 of the wear plate 114 and the blade 112. The process 500 described herein is illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process 500, or alternative processes, and not all of the blocks need be executed. For discussion purposes, the process 500 is described with reference to the environments, devices, architectures, and systems described in the examples herein, such as, for example those described with respect to FIGS. 1-4, although the process 500 may be implemented in a wide variety of other environments, devices, architectures, and systems.

At 502, the robotic welding system 120 may cause the torch head 202 of the welder 204 to position at a first location proximate a first weld point between the wear plate 114 and the blade 112. For example, the controller 220 transmits instructions to the motor(s) 208 to actuate and move the articulating arm(s) 200. Such actuation positions the torch head 202 proximate a weld point between the wear plate 114 and the blade 112. As an example, the welding point may represent a seam between the wear plate 114 and the blade 112, such as a within an accumulation member 118. In some instances, positioning the torch head 202 at the first location may be such that a rotational axis of the torch head 202 is aligned (e.g., collinear, concentric, etc.) with a center of the accumulation member 118.

In some instances, an operator of the robotic welding system 120 may cause the robotic welding system 120 to move for positioning the torch head at the first weld point. Additionally, or alternatively, the robotic welding system 120 may autonomously position the torch head 202. For example, the controller 220 of the robotic welding system 120 may receive the sensor data 214 (e.g., image data) and process the sensor data 214 (e.g., image processing) for knowing locations of the accumulation members 118. Therein the controller 220 may identify, using the sensor data 214, the first welding point between the wear plate 114 and the blade 112.

At 504, the robotic welding system 120 may cause, at the first location, the orbital welder to rotate to weld the first weld point. For example, a motor of the welder 204 actuates to rotate the torch head 202. While being rotated, the torch head 202 welds a seam between the wear plate 114 (or the accumulation member 118) and the blade 112. After rotating 360°, in instances where the accumulation member is circular, the orbital welder may cease welding.

At 506, the robotic welding system 120 may cause the torch head 202 of the orbital welder to position at a second location proximate a second weld point between the wear plate 114 and the blade 112. For example, the controller 220 transmits instructions to the motor(s) 208 to actuate and move the articulating arm(s) 200. Such actuation positions the torch head 202 proximate another weld point between the wear plate 114 and the blade 112. As an example, the weld point represents a seam between the wear plate 114 and the blade 112, such as a within another accumulation member 118. In some instances, positioning the torch head 202 at the second location may be such that a rotational axis of the torch head 202 is aligned (e.g., collinear, concentric, etc.) with a center of the accumulation member 118. As such, after welding the first weld point, the robotic welding system 120 may reposition the torch head 202 to weld the wear plate 114 and the blade 112 at additional locations. Movement of the robotic welding system 120 may done autonomously, via processing sensor data 214 and/or part data 216 of the wear plate 114, and/or via an operator of the robotic welding system 120 controlling a functionality of robotic welding system 120.

At 508, the robotic welding system 120 may cause, at the second location, the orbital welder to rotate to weld the second weld point. For example, a motor of the welder 204 actuates to rotate the torch head 202. While being rotated, the torch head 202 welds a seam between the wear plate 114 (or the accumulation member 118) and the blade 112. From 508, the process 500 may continue to weld additional points for coupling the wear plate 114 and the blade 112. Such process repeats until the wear plate 114 and the blade 112 are sufficiently secured and coupled to one another.

The process 500 therefore illustrates an example for welding the wear plate 114 and the blade 112. Such process 500 may be accomplished, at least in part, via processing sensor data 214 generated by sensor(s) 218 of the robotic welding system 120. For example, the sensor data 214 may be utilized for knowing locations of the accumulation members 118 on the wear plate 114, locations of the torch head 202, positions, orientations, etc. of the accumulation members 118, and so forth. The controller 220, in some instances, control function(s) of the robotic welding system 120 for welding the wear plate 114 and the blade 112, and/or an operator of the robotic welding system 120 may interact with the user interface 400 for positioning the torch head 202 and welding the wear plate 114 to the blade 112.

INDUSTRIAL APPLICABILITY

The disclosed robotic welding system 120 may find use in a variety of applications for welding a wear plate 114 to a blade 112 of a machine 100. The wear plate 114, for example, may reduce wear caused by impacts of debris associated with a grader, a plow, a dozer, and/or the like. The robotic welding system 120 securely welds the wear plate 114 to the blade 112, and locations associated with accumulation members 118.

In operation, the robotic welding system 120 includes articulating arm(s) 200 that actuate via one or motor(s) 208 to move a torch head 202 of the welder 204 into place, adjacent to the accumulation members 118. Sensor(s) 218 capture image data associated with the wear plate 114 and the accumulation members 118. By processing the image data, the robotic welding system 120 determines locations at which to weld the wear plate 114 to the blade 112. In turn, the welding system 120 positions the torch head 202 at the welding locations. Therein, the welder rotates the torch head 202 for welding the wear plate 114 to the blade 112. The robotic welding system 120 therein moves the torch head 202 to additional locations for welding the wear plate 114 to the blade 112.

Using the robotic welding system 120 may increase an accuracy in welding the wear plate 114 to the blade 112. Additionally, the welder 204 may represent an orbital welder that rotates the torch head 202 for welding in a continuous motion, and with sufficient rotational speed to weld an interior of the accumulation members 118 to the blade 112. Additionally, using the sensor(s) 218 to locate the accumulation members 118, and the welding locations, reduces manufacturing time and human-perceived error.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A system, comprising:
a motor;
an articulating arm coupled to the motor;
an orbital welder coupled to the articulating arm, the orbital welder including a torch head that is configured to rotate about a rotational axis, while the articulating arm remains stationary, to weld a wear plate to a blade of a machine;
a sensor configured to capture sensor data associated with a plurality of joint locations between the wear plate and the blade of the machine; and
a controller configured to receive the sensor data from the sensor, access stored part data indicating characteristics of the wear plate, and identify, based at least in part on the sensor data and the part data, a joint location of the plurality of joint locations, wherein, based at least in part on identification of the joint location by the controller:
the motor is configured to move the articulating arm relative to the wear plate such that the torch head of the orbital welder is positioned proximate the joint location, and the rotational axis is disposed substantially colinear with a central axis of a passage extending through the wear plate at the joint location, and
the orbital welder is configured to weld the wear plate to the blade at the joint location by rotating the torch head, about the rotational axis, while the articulating arm remains stationary.

2. The system of claim 1, wherein:
the joint location is disposed between the wear plate and the blade;
the joint location comprises a circular shape formed by a perimeter of the passage;
the stored part data indicates the circular shape and a location of the passage on the wear plate; and
the blade extends across the perimeter of the passage, and transverse to the central axis, such that the blade closes an opening of the wear plate defined by the passage when the wear plate is welded to the blade.

3. The system of claim 1, wherein:
the wear plate includes a plurality of accumulation members that are at least one of circular-shaped, ovular-shaped, square shaped, polygon-shaped, or a combination thereof; and
the orbital welder is configured to weld the wear plate to the blade at a subset of the plurality of joint locations located within the accumulation members.

4. The system of claim 1, further comprising an interface configured to display at least a portion of the orbital welder, the wear plate, and the blade.

5. The system of claim 4, wherein the controller is further configured to:
receive, from the interface, input data associated with the joint location; and
identify, using the input data, the joint location of the plurality of joint locations.

6. A robotic welder, comprising:
a first motor;
one or more articulating arms connected to the first motor, the first motor being configured to rotate the one or more articulating arms at a first speed;
one or more sensors configured to image a wear plate for determining welding locations for welding the wear plate to a blade of a machine; and
an orbital welder connected to a first articulating arm of the one or more articulating arms, the orbital welder including a second motor, and a torch head connected to the second motor, the second motor being configured to rotate the torch head about a rotational axis at a second speed greater than the first speed,
the orbital welder being configured to weld the wear plate to the blade by rotating the torch head relative to a first welding location of the welding locations, at the second speed and using the second motor, while the one or more articulating arms remain stationary.

7. The robotic welder of claim 6, wherein:
the wear plate comprises passages disposed through a thickness of the wear plate;
the welding locations are located at joints between the wear plate and the blade, at a subset of the passages; and
a welding path that is to be followed by the torch head is defined by a perimeter of a first passage of the subset of the passages at a first joint location between the wear plate and the blade.

8. The robotic welder of claim 7, wherein the torch head comprises an angled torch head for being disposed at least partially within the subset of the passages during welding.

9. The robotic welder of claim 6, further comprising a controller configured to position, via the one or more motors, the torch head proximal to the welding locations.

10. The robotic welder of claim 6, further comprising a controller operably connected to the first motor, the one or more sensors, and the orbital welder, the controller being configured to:
determine the welding locations based on sensor data received from the one or more sensors and stored part data indicating respective locations of a plurality of passages extending through the wear plate; and
operate the first motor to position the orbital welder such that, during welding of the wear plate to the blade, a rotational axis of the torch head is disposed substantially colinear with a central axis of a passage of the plurality of passages.

11. The robotic welder of claim 6, further comprising a user interface configured to receive input from an operator of the robotic welder to at least partially control an operation of the robotic welder.

12. The robotic welder of claim 6, wherein:
the welding locations comprise a first welding location and a second welding location;

at a first instance in time, the orbital welder is configured to rotate the torch head for welding the wear plate to the blade at the first welding location;

at a second instance in time, the first motor is configured to actuate the one or more articulating arms for positioning the torch head proximate the second welding location; and at a third instance in time, the orbital welder is configured to rotate the torch head for welding the wear plate to the blade at the second welding location.

13. The system of claim 1, wherein the sensor is a camera disposed on at least one of the articulating arm or the orbital welder proximate the torch head, the camera configured to provide, to the controller, image data associated with the plurality of the joint locations between the wear plate and the blade.

14. The robotic welder of claim 6, wherein a first sensor of the one or more sensors is a camera disposed on or within a surface of at least one of the one or more articulating arms or the orbital welder proximate the torch head, the camera configured to provide, to a controller of the robotic welder, image data associated with the welding locations.

* * * * *